United States Patent
Gyoten et al.

(10) Patent No.: US 6,541,144 B2
(45) Date of Patent: Apr. 1, 2003

(54) FUEL CELL SYSTEM

(75) Inventors: Hisaaki Gyoten, Shijonawate (JP);
Hiroki Kusakabe, Sakai (JP); Eiichi Yasumoto, Katano (JP); Osamu Sakai, Neyagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 176 days.

(21) Appl. No.: 09/829,454

(22) Filed: Apr. 10, 2001

(65) Prior Publication Data

US 2001/0033954 A1 Oct. 25, 2001

(30) Foreign Application Priority Data

Apr. 13, 2000 (JP) ........................................ 2000-111733

(51) Int. Cl.[7] ............................. H01M 8/18; H01M 8/10
(52) U.S. Cl. ............................ 429/21; 429/32; 429/41
(58) Field of Search ............................... 429/21, 32, 41

(56) References Cited

U.S. PATENT DOCUMENTS

| | | | |
|---|---|---|---|
| 3,532,548 A | * | 10/1970 | Stachurski |
| 4,673,624 A | | 6/1987 | Hockaday |
| 4,916,033 A | | 4/1990 | Gourdine |
| 5,631,099 A | | 5/1997 | Hockaday |
| 5,759,712 A | | 6/1998 | Hockaday |
| 5,993,986 A | | 11/1999 | Wallin et al. |
| 6,048,634 A | | 4/2000 | Kaufman et al. |

FOREIGN PATENT DOCUMENTS

| | | | |
|---|---|---|---|
| JP | 1-148327 | * | 6/1989 |
| JP | 10-81985 | * | 3/1998 |

OTHER PUBLICATIONS

The Development Of An Ultra Small–Sized Fuel Cell For Portable Appliances, Report from Nikkei Science, vol. 7, pp. 17, (1998) (No month).

* cited by examiner

Primary Examiner—John S. Maples
(74) Attorney, Agent, or Firm—Akin, Gump, Strauss, Hauer & Feld, L.L.P.

(57) ABSTRACT

A fuel cell system includes a first electrolyte-electrode assembly which comprises a hydrogen ion-conductive electrolyte layer, and a fuel electrode and a hydrogen-generating electrode that sandwich the electrolyte layer; a second electrolyte-electrode assembly which comprises a hydrogen ion-conductive electrolyte layer, and a fuel electrode and an oxidant electrode that sandwich the electrolyte layer; a fuel supplying means for supplying a liquid or gas fuel to the fuel electrode of the first electrolyte-electrode assembly; a means for applying to the fuel electrode of the first electrolyte-electrode assembly a potential which is positive to the hydrogen-generating electrode; and a means for supplying to the fuel electrode of the second electrolyte-electrode assembly hydrogen generated in the hydrogen-generating electrode.

7 Claims, 2 Drawing Sheets

FUEL CELL SYSTEM

BACKGROUND OF THE INVENTION

The present invention relates to fuel cells which are useful for cogeneration systems and mobile apparatuses. More specifically, it relates to polymer electrolyte fuel cells.

Fuel cells generate electric power and heat simultaneously by electrochemically reacting a fuel such as hydrogen and an oxidant gas such as air at a gas diffusion electrode, and there are several types different with respect to the type of electrolyte used and the operating temperature. In polymer electrolyte fuel cells, it is mainstream to use as a polymer electrolyte, fluorocarbon polymer with a sulfonic acid group introduced as a side chain terminal group. An electrode reaction layer which is mainly composed of a carbon powder with a platinum group metal catalyst carried thereon is formed on each side of the electrolyte layer. A pair of electrically conductive porous sheet material which has both gas permeability and electric conductivity is formed on the outer surfaces of the electrode reaction layers. This combination of the electrically conductive porous sheet material and the electrode reaction later is referred to as a gas diffusion electrode.

Provided on the outer surface of the gas diffusion electrodes are electrically conductive separator plates for mechanically fixing these electrolyte-electrode assemblies and for electrically connecting in series the adjacent assemblies. On the surface of the separator plates contacting the electrodes, gas flow paths are formed for supplying reaction gases to the electrode surfaces and for transporting a generated gas and an excess gas away. In the periphery of the separator plates and the electrodes, sealing members such as gaskets and sealants are provided for preventing two reaction gases from being directly mixed or leaking out.

To one of the pair of gas diffusion electrodes, a gas containing hydrogen as a reaction gas is generally supplied. However, organic liquids such as alcohol and ether are used in some cases. To the other gas diffusion electrode, an oxidant gas such as air is supplied.

In the system where a fuel gas is used as a reaction gas, it is necessary to provide a reformer for transforming organic fuel substances such as methane gas, propane gas and alcohol into gases containing hydrogen richly by reforming reaction such as partial combustion and hydrogenation.

A power generator is usually constructed as a stacked cell in which a plurality of unit cells comprising the electrolyte layer, electrode reaction layers, separator plates and the like are stacked, and in which a fuel gas such as hydrogen and air are supplied to the gas flow path of each unit cell through manifolds. Electric current generated in the electrode reaction layers is collected in the electrically conductive porous sheet material and is taken outside through the separator plates. For the separator plates, a carbon material which is electrically conductive and has both gas tightness and corrosion resistance is often used. However, metallic separator plates such as stainless steel are also used in view of its good processability and inexpensiveness, and also from the viewpoint that thinner separator plates can be obtained Since heat is generated during power generation utilizing the electrochemical reaction, cooling water or antifreezing fluid is allowed to flow inside the cell to control the cell temperature. In general, heated cooling water is cooled by a heat exchanger disposed outside the cell and flows again to the inside of the cell.

In the case where a fluorocarbon polymer with a sulfonic acid group introduced therein is used as the electrolyte, if organic liquids such as alcohol is used as the reaction gas, these organic liquids permeate through the fuel electrode and the electrolyte layer to reach the air electrode in the opposite side. As a result, in the air electrode, organic fuel substances cause direct catalytic combustion with oxygen contained in the air to impair the cell performance. Also, in the fuel electrode, a decrease in the cell performance occurs presumably due to CO poisoning as a result of the electrode reaction.

On the other hand, in the case where a reformed gas formed in a reformer is used as the reaction gas, the electrode is poisoned by $CO_2$ and CO contained in a small amount during a long duration of operation, and thereby the cell performance is impaired. Further, from the viewpoint of the fuel cell system, the fact that a reformer must be provided separately results in complication of the system and an increase in the cost.

BRIEF SUMMARY OF THE INVENTION

The principal object of the present invention is to provide a direct methanol type fuel cell having an improved cell performance and durability.

Another object of the present invention is to provide a fuel cell using as the fuel a reformed gas containing hydrogen and having an improved resistance to CO poisoning.

The present invention provides a fuel cell system comprising:

- a first electrolyte-electrode assembly comprising a hydrogen ion-conductive electrolyte layer, and a fuel electrode and a hydrogen-generating electrode sandwiching the electrolyte layer;
- a second electrolyte-electrode assembly comprising a hydrogen ion-conductive electrolyte layer, and a fuel electrode and an oxidant electrode sandwiching the electrolyte layer;
- a fuel supplying means for supplying a liquid or gas fuel to the first electrolyte-electrode assembly;
- a means for applying to the first electrolyte electrode assembly a potential which is positive to the hydrogen-generating electrode; and
- a means for supplying to the fuel electrode of the second electrolyte-electrode assembly hydrogen generated in the hydrogen-generating electrode.

Herein, it is preferable that the hydrogen-generating electrode of the first electrolyte-electrode assembly and the fuel electrode of the second electrolyte-electrode assembly are electrically connected. In this case, it is more preferable that the hydrogen-generating electrode of the first electrolyte-electrode assembly and the fuel electrode of the second electrolyte-electrode assembly are unified. In another preferred mode, the hydrogen-generating electrode of the first electrolyte-electrode assembly and the fuel electrode of the second electrolyte-electrode assembly are combined with a water repellent, electrically conductive layer interposed therebetween.

As a means for applying to the first electrolyte-electrode assembly a potential which is positive to the hydrogen-generating electrode, the second electrolyte-electrode assembly is preferably used.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
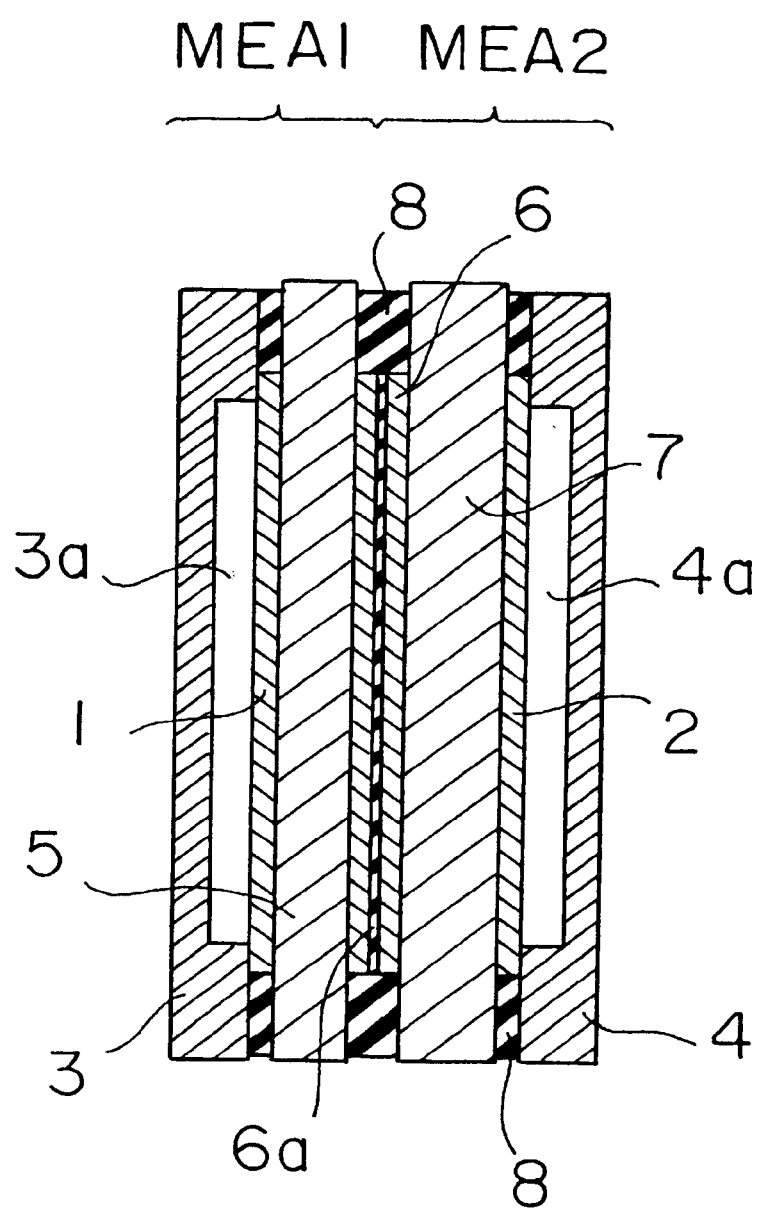
FIG. 1 is a longitudinal cross sectional view showing the structure of a fuel cell system according to one embodiment of the present invention.

The fuel cell system of the present invention will be described with reference to FIG. 1 showing one embodiment of the invention.

Numeral 1 is a porous electrode containing for example ruthenium as the catalyst. The porous electrode 1 and a gas diffusion electrode 6 sandwich a hydrogen ion-conductive electrolyte layer 5 to form a first electrolyte-electrode assembly "MEA 1". The gas diffusion electrode 6 has an electrode reaction layer containing catalyst on its both surfaces and a gas diffusion electrode 2 has an electrode reaction layer containing catalyst on its one surface. The gas diffusion electrode 6 and the gas diffusion electrode 2 sandwich a hydrogen ion-conductive electrolyte layer 7 to form a second electrolyte-electrode assembly "MEA 2". These electrolyte-electrode assemblies are sandwiched by an electrically conductive separator plate 3 having a supply path 3a for supplying a fuel to the porous electrode 1 and an electrically conductive separator 4 having a supply path 4a for supplying an oxidant gas to the gas diffusion electrode 2. These members are fastened by bolts and nuts (not shown) to be combined into one unit. In the periphery of the electrolyte layers, sealants 8 are provided for preventing leakage of the fuel and the oxidant gas.

When a liquid fuel containing alcohol and water is supplied to the porous electrode 1 (fuel electrode) and air is supplied to the gas diffusion electrode 2 (oxidant electrode), and the terminal of the porous electrode 1 and the terminal of the gas diffusion electrode 2 are connected with a load, an electrical connection is established such that, from the gas diffusion electrode 2 as the positive electrode of the MEA 2 which has a function of a usual fuel cell, a positive potential is applied to the porous electrode 1 via the load. As a result, alcohol is reacted with water to form carbon dioxide and hydrogen ions, and the formed hydrogen ions pass through the electrolyte layer 5 and turn into hydrogen gas at the gas diffusion electrode 6 in the center. At the gas diffusion electrode 6, the electrode reaction takes place in the interface with the other electrolyte layer 7, hydrogen gas turns again into hydrogen ions, which migrate through the electrolyte layer 7 to reach the gas diffusion electrode 2. At the gas diffusion electrode 2, the hydrogen ions are reacted with oxygen contained in the air to form water. During this time, electric current runs from the porous electrode 1 passing through the electrolyte layer 5, the gas diffusion electrode 6 and the electrolyte layer 7 toward the gas diffusion electrode 2. In the gas diffusion electrode 6 in the center, in order to prevent direct contact of the electrolyte layer 5 with the electrolyte layer 7, it is preferable to provide a highly water-repellent portion 6a and to make a gas layer present therein. The presence of such gas diffusion electrode 6 in the center suppresses the permeation of an organic fuel such as alcohol contained in a liquid fuel to the gas diffusion electrode 2 on the air side.

In the porous electrode 1, the electrode performance is impaired, poisoned by CO which is formed as a side reaction of the electrode reaction. When the poisoning is further progressed and the potential of the porous electrode 1 to the electrolyte layer 5 is increased, CO adsorbed on the surface of the catalyst is reacted with coexisting water and is removed as $CO_2$, thereby recovering the electrode performance. As a consequence, the resistance to CO poisoning of the porous electrode 1 as the fuel electrode is maintained high.

As one ideal embodiment of the fuel cell system of the present invention, FIG. 1 shows a five-layer system in which the electrode 6 serves both as the hydrogen-generating electrode of the first electrolyte-electrode assembly MEA 1 and as the fuel electrode of the second electrolyte-electrode assembly MEA2. In theory, however, it is also possible to make a fuel cell system where there are two electrolyte-electrode assemblies each comprising an electrolyte layer and a pair of electrode layers sandwiching the electrolyte layer; one of the assemblies i.e. the MEA2 has a function of the electrolyte-electrode section of an usual fuel cell, and the other assembly i.e. the MEA1 has a function of converting the fuel and forming hydrogen, or increasing the concentration of hydrogen. In this case, two electrolyte-electrode assemblies are constructed in such a manner that hydrogen generated in the hydrogen-generating electrode of the MEA1 is supplied to a the fuel electrode of the MEA2 and the both electrodes are electrically connected. By constructing the two electrolyte-electrode assemblies so that they are separated spatially, the resistance to co poisoning is improved and the permeation of the fuel to the air electrode is suppressed at the same time. As a consequence, the use of such a structure is highly appreciated in the direct methanol type fuel cells using liquid fuels.

EXAMPLE

In the following, an example of the present invention will be described.

A carbon powder with a platinum catalyst carried thereon was dispersed in an alcohol solution as a polymer electrolyte to prepare a slurry. On the other hand, a carbon paper of 200 microns thick serving as a gas diffusion electrode was immersed in an aqueous dispersion of polytetrafluoroethylene (PTFE), and it was dried and thermally treated to give an electrically conductive porous sheet material having water repellency. On one surface of this electrically conductive porous sheet material, the polymer electrolyte slurry containing a carbon powder with platinum catalyst carried thereon, as described above, was applied and dried, and thereby obtained was a gas diffusion electrode 3 having an electrode reaction layer on its one surface. Further, in place of the carbon powder with platinum catalyst carried thereon, a carbon powder with a catalyst comprising a solid solution of equimolar ruthenium and platinum carried thereon was used to prepare a polymer electrolyte slurry. Then, this slurry was applied on one surface of an electrically conductive porous sheet material having water repellency and was dried to give a gas diffusion electrode 1 having an electrode reaction layer containing ruthenium on its one surface. Further, in the same manner, on both surfaces of another electrically conductive porous sheet material having water repellency, an electrode reaction layer comprising platinum only was formed to give a gas diffusion electrode 6.

These gas diffusion electrodes and two electrolyte membranes of 50 microns thick were prepared, and as shown in FIG. 1, the gas diffusion electrode 1 having on its one surface an electrode reaction layer containing ruthenium, the electrolyte membrane 5, the gas diffusion electrode 6 having on its both surfaces an electrode reaction layer containing only platinum, the electrolyte membrane 7 and the gas diffusion electrode 2 having on its one surface an electrode reaction layer containing only platinum were stacked in this order and were joined by hot pressing for 10 minutes to give an electrolyte-electrode assembly. Herein, the electrodes 1 and 2 having an electrode reaction layer on their one surface were arranged so that the electrode reaction layer was brought in contact with the electrolyte membrane. Also, the amount of the catalyst carried was 0.5 mg/cm$^2$ per surface area of one surface of the electrode.

As the aforementioned electrically conductive porous sheet material, there can also be used a carbon cloth woven of carbon fiber as a flexible material, and further a carbon felt formed from a mixture of a carbon fiber, a carbon powder and an organic binder.

On the surface of stainless steel flat plates as the separator plates, a surpentine fluid flow path was formed by cutting, and at both ends of the stainless steel flat plates, manifold apertures were provided for supplying reaction substances such as air or alcohol and for discharging reaction products. The surfaces of these stainless steel flat plates were gold-plated in a thickness of 2 microns to be provided with corrosion resistance. In the periphery of the electrodes of the electrolyte-electrode assembly, corrosion-resistant rubber sheet 8 whose thickness was adjusted was inserted as gas sealants. These members were sandwiched by two separator plates 3 and 4 and fastened by bolts and nuts with a coil spring interposed between the nut and the separator plate.

A mixed liquid containing methanol and water in the ratio of 1:1 was passed through the fluid flow path 3a on the side of the porous electrode 1, and air was passed through the fluid flow path 4a on the side of the gas diffusion electrode 2. Then, a load was connected between the terminal of the gas diffusion electrode 2 and the terminal of the porous electrode 1. Although some loss of voltage occurs in the hydrogen pump portion of the MEA1, cross leakage of methanol and poisoning by the by-product CO can be suppressed.

Figure 2:
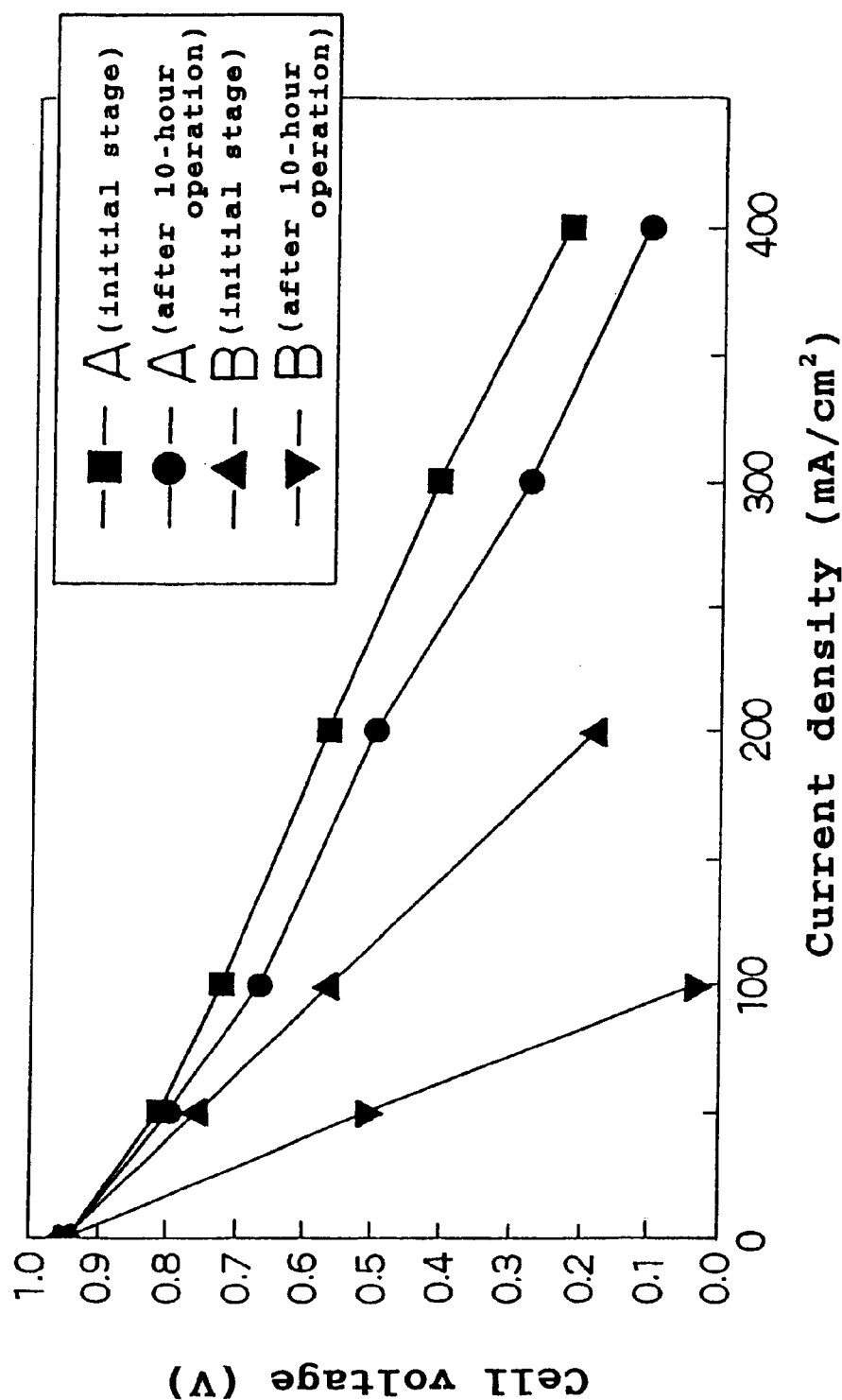
FIG. 2 is a graph showing the performance of the fuel cell systems of the example and the comparative example.

As a comparative example, using a cell having a conventional three-layer structure, i.e. structure comprising the porous electrode 1, the electrolyte layer 7 and the gas diffusion electrode 2, a mixed liquid of methanol and water was passed on the side of the porous electrode 1 and the air was introduced on the side of the gas diffusion electrode 2, then a discharge test was carried out. FIG. 2 shows I-V characteristics immediately after the start of operation together with I-V characteristics after 10 hours of continuous operation at 0.1 A/cm$^2$. As is understood from FIG. 2, the fuel cell system A according to the present invention exhibits a higher performance compared with the conventional fuel cell B. This is presumably because cross leakage caused by the permeation of alcohol was prevented. Further, after a continuous operation of 10 hours, which is rather a short time though, the performance was hardly deteriorated. This is probably because poisoning by Co formed as a by-product during the electrode reaction was suppressed.

In order to examine the effect of imparting water repellency to the gas diffusion electrode 6 in the center, an electrolyte-electrode assembly was prepared using a gas diffusion electrode which was not subjected to water repelling treatment with an aqueous dispersion of PTFE at the time of its preparation and a cell test was carried out. As a result, the cell performance was rapidly impaired compared with the cell subjected to water repelling treatment. The reason why the performance of the cell subjected to water repelling treatment is superior is considered that, by the water repelling treatment, a water repellent layer which is not moistened with liquids such as water is formed inside the gas diffusion electrode in the center, and therefore the permeation of alcohol is suppressed.

Described in the above is a result obtained when a porous electrode having an electrode reaction layer containing ruthenium is used as the electrode to which a mixed liquid of methanol and water are supplied. An experiment was also carried out using an electrolyte-electrode assembly including an electrode reaction layer which contains no ruthenium but only platinum catalyst. As a result, the performance and the durability of the cell was improved compared with the cell having the conventional structure, although the result was inferior to the case where ruthenium was used.

Next, a test was carried out using a dummy gas having almost the same composition as that of the reformed gas obtained by hydrogenation using town gas as the fuel, that is, a dummy gas containing 75% hydrogen, 25% carbon dioxide and 100 ppm carbon monoxide. In place of the mixed liquid of methanol and water, the dummy gas was introduced and a cell performance test was carried out. In general, the cell performance is higher in the case where a gas containing hydrogen such as a reformed gas is used than in the case where a liquid fuel such as methanol is directly used. However, it was confirmed that the fuel cell having the structure of the present invention had a higher performance than the cell having the conventional three-layer structure.

Next, a discharge test was carried out by not allowing the mixed liquid of methanol and water to flow but confining it in the fluid flow path, and not providing a gas flow path to the air electrode side but letting open to the air. Compared to the system where methanol and water is allowed to flow in one electrode and air is allowed to flow to the other electrode, the cell performance was inferior; however, a discharge for a long duration was possible at a current density of 0.1 A/cm$^2$. About 13 hours later, the cell performance was impaired. This was due to dryness in the air electrode. As a consequence, it is considered that an operation for a long duration will become possible by maintaining a balance between diffusion and inflow of oxygen from outside, and evaporation and scattering of water.

The present invention is highly useful since it permits an improvement on the performance and the durability of the fuel cell system. The present invention also permits a cost reduction since it requires no reformer.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A fuel cell system including:
    a first electrolyte-electrode assembly which comprises a hydrogen ion-conductive electrolyte layer, and a fuel electrode and a hydrogen-generating electrode that sandwich said electrolyte layer;
    a second electrolyte-electrode assembly which comprises a hydrogen ion-conductive electrolyte layer, and a fuel electrode and an oxidant electrode that sandwich said electrolyte layer;
    a fuel supplying means for supplying a liquid or gas fuel to the fuel electrode of the first electrolyte-electrode assembly;

a means for applying to the fuel electrode of the first electrolyte-electrode assembly a potential which is positive to the hydrogen-generating electrode; and a means for supplying to the fuel electrode of the second electrolyte-electrode assembly hydrogen generated in the hydrogen-generating electrode.

2. The fuel cell system in accordance with claim 1, wherein the hydrogen-generating electrode of the first electrolyte-electrode assembly and the fuel electrode of the second electrolyte-electrode assembly are electrically connected.

3. The fuel cell system in accordance with claim 2, wherein the hydrogen-generating electrode of the first electrolyte-electrode assembly and the fuel electrode of the second electrolyte-electrode assembly are unified.

4. The fuel cell system in accordance with claim 2, wherein the hydrogen-generating electrode of the first electrolyte-electrode assembly and the fuel electrode of the second electrolyte-electrode assembly are combined with a water repellent, electrically conductive layer interposed therebetween.

5. The fuel cell in accordance with claim 1, wherein the means for applying to the first electrolyte-electrode assembly a potential which is positive to the hydrogen-generating electrode is the second electrolyte-electrode assembly.

6. The fuel cell in accordance with claim 1, wherein the hydrogen ion-conductive electrolyte layer is a polymer electrolyte membrane and wherein said fuel is a mixed liquid comprising alcohol and water, or a mixed gas comprising hydrogen and carbon dioxide.

7. The fuel cell system in accordance with claim 1, wherein the fuel electrode of the first electrolyte-electrode assembly comprising ruthenium as the catalyst.

* * * * *